United States Patent
Son et al.

(10) Patent No.: US 11,757,151 B2
(45) Date of Patent: Sep. 12, 2023

(54) CATHODE MATERIAL FOR LITHIUM-AIR BATTERY AND METHOD OF MANUFACTURING CATHODE USING SAME

(71) Applicants: Hyundai Motor Company, Seoul (KR); Kia Motors Corporation, Seoul (KR); Seoul National University R&DB Foundation, Seoul (KR)

(72) Inventors: Sam Ick Son, Suwon (KR); Young Joon Bae, Seoul (KR); Hyeok Jun Park, Seoul (KR); Ki Suk Kang, Seoul (KR); Young Min Ko, Seoul (KR); Sung Kwan Park, Seoul (KR)

(73) Assignees: Hyundai Motor Company, Seoul (KR); Kia Motors Corporation, Seoul (KR); Seoul National University R&DB Foundation, Seoul (KR)

( * ) Notice: Subject to any disclaimer, the term of this patent is extended or adjusted under 35 U.S.C. 154(b) by 106 days.

(21) Appl. No.: 16/950,426

(22) Filed: Nov. 17, 2020

(65) Prior Publication Data

US 2021/0399365 A1 Dec. 23, 2021

(30) Foreign Application Priority Data

Jun. 17, 2020 (KR) .......................... 10-2020-0073305

(51) Int. Cl.
| | |
|---|---|
| *H01M 4/133* | (2010.01) |
| *H01M 4/38* | (2006.01) |
| *H01M 4/62* | (2006.01) |
| *H01M 4/1393* | (2010.01) |
| *H01M 4/583* | (2010.01) |
| *H01M 12/08* | (2006.01) |

(52) U.S. Cl.
CPC ............ *H01M 12/08* (2013.01); *H01M 4/133* (2013.01); *H01M 4/1393* (2013.01); *H01M 4/382* (2013.01); *H01M 4/583* (2013.01); *H01M 4/622* (2013.01)

(58) Field of Classification Search
CPC .... H01M 4/133; H01M 4/1393; H01M 4/382; H01M 4/583; H01M 4/622; H01M 4/8663; H01M 4/8668; H01M 4/8828; H01M 4/96; H01M 12/08; H01M 2004/8689; H01M 2300/0045; H01M 2300/0082
See application file for complete search history.

(56) References Cited

U.S. PATENT DOCUMENTS

| | | | |
|---|---|---|---|
| 7,531,114 B2 | 5/2009 | Fukushima et al. | |
| 10,122,046 B2 * | 11/2018 | Abraham | .......... H01M 10/0525 |
| 11,374,274 B2 * | 6/2022 | Kwon | ................ C01G 45/1264 |

(Continued)

FOREIGN PATENT DOCUMENTS

KR 2019-0081377 A 7/2019

*Primary Examiner* — Ula C Ruddock
*Assistant Examiner* — Scott J Chmielecki
(74) *Attorney, Agent, or Firm* — Fox Rothschild LLP

(57) ABSTRACT

The present invention relates to a cathode material for a lithium-air battery and a method of manufacturing a cathode using the same. The cathode material of the present invention includes a solvent component and thus includes an electrolyte in a small amount compared to a conventional cathode material, thereby reducing the weight of a cathode manufactured using the cathode material, ultimately increasing the energy density of a lithium-air battery including the cathode.

10 Claims, 8 Drawing Sheets

(56) References Cited

U.S. PATENT DOCUMENTS

| | | | |
|---|---|---|---|
| 11,380,893 B1* | 7/2022 | Kim | H01M 4/525 |
| 11,380,936 B2* | 7/2022 | Rhee | H01M 50/409 |
| 2016/0064785 A1* | 3/2016 | Kim | H01M 50/46 |
| | | | 429/405 |
| 2017/0125793 A1* | 5/2017 | Kim | H01M 4/0404 |
| 2018/0040904 A1* | 2/2018 | Choi | H01M 10/0525 |
| 2018/0090802 A1* | 3/2018 | Kwon | H01M 12/06 |
| 2018/0265899 A1* | 9/2018 | Noritomi | C10L 1/023 |
| 2018/0331367 A1* | 11/2018 | Kim | H01M 4/8626 |
| 2019/0036127 A1* | 1/2019 | Park | H01M 4/382 |
| 2019/0157648 A1* | 5/2019 | Yeo | H01M 10/0585 |
| 2019/0190005 A1* | 6/2019 | Lee | H01M 10/0565 |
| 2020/0099104 A1* | 3/2020 | Watanabe | H01M 10/052 |
| 2020/0136181 A1* | 4/2020 | Sera | H01M 4/136 |
| 2020/0168950 A1* | 5/2020 | Park | H01M 10/0525 |
| 2020/0365897 A1* | 11/2020 | Badding | H01M 4/664 |
| 2022/0077468 A1* | 3/2022 | Lee | H01M 10/0525 |
| 2022/0102713 A1* | 3/2022 | Ansari | H01M 4/622 |
| 2022/0209220 A1* | 6/2022 | Lee | H01M 10/052 |

* cited by examiner

Example 1-1          Example 1-2

CATHODE MATERIAL FOR LITHIUM-AIR BATTERY AND METHOD OF MANUFACTURING CATHODE USING SAME

CROSS REFERENCE TO RELATED APPLICATION

The present application claims priority based on Korean Patent Application No. 10-2020-0073305, filed on Jun. 17, 2020, the entire content of which is incorporated herein for all purposes by this reference.

TECHNICAL FIELD

The present invention relates to a cathode material capable of reducing the weight of a cathode to thus increase the energy density of a lithium-air battery and a method of manufacturing a cathode using the same.

BACKGROUND OF THE INVENTION

A lithium-air battery, which is a kind of electrochemical battery, typically includes an anode enabling deposition/dissolution of lithium ions, a cathode enabling oxidation/reduction of oxygen in the air, and a metal-ionic conductive medium or a solid electrolyte interposed between the cathode and the anode.

A lithium-air battery is a high-capacity battery because lithium metal alone is used as the anode and there is no need to store air, which is the cathode active material, in the battery. For example, the theoretical energy density per unit weight of the lithium-air battery is very high, about 3500 Wh/kg or greater.

Meanwhile, a carbon-based material mainly used for the cathode or air electrode has a high specific surface area, and the surface thereof is non-polar. Also, the electrolyte that transports lithium ions to the cathode or air electrode is a polar polymer or an ionic liquid. Since the polarity of the surface of the carbon-based material is different from that of the electrolyte, the interfacial tension between the carbon-based material and the electrolyte is high. Therefore, it is difficult to sufficiently impregnate the carbon-based material with the electrolyte, so the carbon-based material is not uniformly dispersed in the electrolyte. Moreover, since it is difficult to make full use of the high specific surface area of the carbon-based material, there is a problem in that the path for transport of lithium ions in the cathode is reduced.

Accordingly, methods for improving the contact between the surface of the carbon-based material and the electrolyte have been demanded and development has been made therefor. However, a problem of decreasing the energy density of the lithium-air battery may occur, for example, because the electrolyte is included in excess.

SUMMARY OF THE INVENTION

In preferred aspects, provided is a cathode material, which includes a solvent component and thus includes an electrolyte in a small amount, a method of manufacturing a cathode using the cathode material, a cathode including a carbon material that is loaded in a large amount, and a lithium-air battery having high charge/discharge capacity and charge/discharge voltage.

The objectives of the present invention are not limited to the foregoing, and will be able to be clearly understood through the following description and to be realized by the means described in the claims and combinations thereof.

In an aspect, provided is a cathode material including a carbon material, an electrolyte, a solvent component, and a binder. The electrolyte may include a lithium salt and an ionic liquid. Preferably, the mass ratio of the carbon material and the electrolyte may be about 1:2-20.

The term "binder", as used herein, refers to a resin or a polymeric material that can be polymerized or cured to form a polymeric matrix. The binder may be cured (polymerized) or partially cured upon curing process such as heating, UV radiation, electron beaming, chemical polymerization using additives and the like. Preferably, the binder of the present invention may contain polyamic acid that can be polymerized into polyimide upon heating. Preferably, the binder according to the present invention generally refers to a polyimide binder.

The term "ionic liquid" as used herein refers to a salt substance in the liquid state under a temperature of 100° C., for example, at a room temperature. The ionic liquid includes one or more anions and cations, may be bulky organic or inorganic anions or cations. In certain embodiments, the ionic liquid may be formed by strong ionic (Coulomic) interaction between the anions and cations so as to form thermally, mechanically, and electrochemically stable material. Preferred ionic liquid may have a negligible vapor pressure (unless decomposition occurs) and be non-flammable and immiscible with the solvent component (e.g., water or organic solvents).

The carbon material may suitably include one or more selected from the group consisting of carbon nanotubes (CNTs), carbon nanofibers, and carbon nanobelts.

The electrolyte may suitably include one or more selected from the group consisting of an ionic liquid and an ionic conductive polymer.

The ionic liquid may suitably include one or more selected from the group consisting of 1-ethyl-3-methylimidazolium bis(trifluoromethylsulfonyl)imide (EMI-TFSI), diethylmethylammonium trifluoromethanesulfonate ([dema][TfO]), dimethylpropylammonium trifluoromethanesulfonate ([dmpa][TfO]), diethylmethylammonium trifluoromethanesulfonylimide ([dema][TFSI]), methylpropylpiperidinium trifluoromethanesulfonylimide ([mpp][TFSI]).

The solvent component may suitably include N-methyl-2-pyrrolidone (NMP).

The amount of the solvent component may be about 50 to 250 mL per g of the carbon material.

The binder may suitably include poly(diallyldimethylammonium) bis(trifluoromethanesulfonyl)imide (PDDA-TFSI).

The amount of the binder may be about 15 to 25 parts by weight based on 100 parts by weight of the carbon material.

In an aspect, provided is a method of manufacturing a cathode. The method may include: preparing a cathode slurry including the cathode material described herein; forming a cathode slurry layer by applying the cathode slurry on a current collector; and heat-treating the cathode slurry layer.

The cathode slurry layer may have a thickness of about 100 to 1000 μm.

The heat-treating may be performed in a vacuum at room temperature for about 22 to 48 hr.

In an aspect, provided is a cathode, which is manufactured by the method described herein. The cathode may suitably include a carbon material loaded in an amount of about 3.00 to 6.00 mg/cm².

In an aspect, provided is a lithium-air battery including the cathode described herein, an anode enabling deposition and dissociation of lithium, and a polymer electrolyte interposed between the cathode and the anode. The lithium-air battery may have a charge/discharge voltage of about 2 to 4.7 V and a charge/discharge capacity of about 12 to 25 mAh/cm$^2$.

According to various exemplary embodiments of the present invention, a cathode material may include a solvent component and thus may include an electrolyte in less amount than the amount of electrolyte in a conventional cathode material. As such, the weight of a cathode manufactured using the cathode material may be reduced, thereby increasing the energy density of a lithium-air battery including the cathode.

The effects of the present invention are not limited to the foregoing, and should be understood to include all effects that can be reasonably anticipated from the following description.

Other aspects of the invention are disclosed infra.

DETAILED DESCRIPTION

Figure 1:
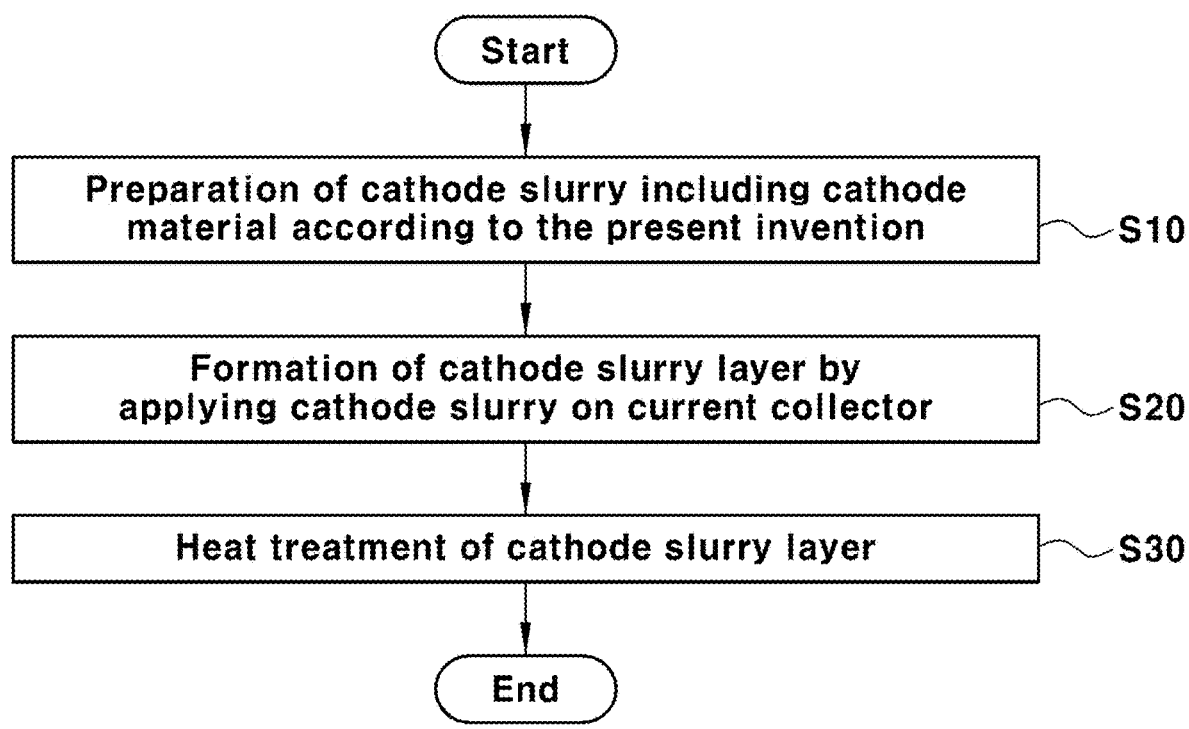
FIG. 1 shows an exemplary process of manufacturing a cathode according to an exemplary embodiment of the present invention.

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Hereinafter, a detailed description will be given of a cathode material, a method of manufacturing a cathode using the same, a cathode manufactured through the above method, and a lithium-air battery including the cathode according to exemplary embodiments of the present invention.

Cathode Material

The cathode material is a material capable of manufacturing a cathode included in a lithium-air battery, and is not particularly limited, so long as it is able to increase the energy density of a lithium-air battery by decreasing the amount of an electrolyte included therein.

The cathode material may include a carbon material, an electrolyte, a solvent component, and a binder.

The mass ratio of the carbon material and the electrolyte included in the cathode material may be about 1:2-20, the amount of the solvent component may be about 50 to 250 mL per g of the carbon material, and the amount of the binder may be about 15 to 25 parts by weight based on 100 parts by weight of the carbon material.

(1) Carbon Material

The carbon material is included in the cathode material along with the electrolyte, and is thus complexed through cation-π interaction with the ionic liquid included in the electrolyte, thereby expanding a path for transport of lithium ions. Here, the carbon material is not particularly limited, so long as it has a large specific surface area.

The carbon material may have at least one structure selected from among spherical, rod, plate, and tube shapes, but is not necessarily limited thereto, and any structure capable of being used as a core in the art may be applied.

The carbon material may have a large specific surface area and may be porous due to the presence of pores therein. For example, it may be mesoporous, and moreover, some or all of the various types of carbon-based cores described above may be porous.

The carbon material is a typically known carbon material capable of being used, and may include one or more selected from the group consisting of, for example, carbon nanotubes (CNTs), carbon nanofibers, carbon nanobelts, carbon black, Ketjen black, acetylene black, natural graphite, artificial graphite, expanded graphite, graphene, graphene oxide, fullerene soot, mesocarbon microbeads (MCMBs), soft carbon, hard carbon, pitch carbide, mesophase pitch carbide, and fired coke, and is not limited to including specific components. Preferably useful are linear carbon nanotubes having excellent conductivity, a large specific surface area for reaction, and a pi (π) bond for bonding with an ionic liquid, and capable of ensuring mechanical strength due to entanglement between carbon materials.

The amounts of the electrolyte, solvent component, and binder may be determined based on the amount of the carbon material according to the present invention.

(2) Electrolyte

The electrolyte is not particularly limited, so long as it is included in the cathode material along with the carbon material and may be thus complexed with the carbon material through cation-π interaction with the ionic liquid included therein, thereby expanding a path for transport of lithium ions.

The electrolyte included in the cathode material may include at least one selected from the group consisting of typical electrolytes capable of being used in the present invention, for example, a lithium salt and an ionic liquid, and is not limited to including specific components.

The lithium salt is not particularly limited, so long as it may act as a source of lithium ions in the battery and may promote the movement of lithium ions between the cathode and the polymer electrolyte membrane. The lithium salt may include at least one selected from the group consisting of typical lithium salts capable of being used in the present invention, for example, one or more selected from the group consisting of LiTFSI, $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (in which x and y are natural numbers), LiF, LiBr, LiCl, LiI and $Li_B(C_2O_4)_2$ (lithium bis(oxalato)borate; LiBOB), and is not limited to including specific components. Preferably, the lithium salt may be LiTFSI, which has the same anion of TFSI as the anion of the ionic liquid.

The ionic liquid is a typical ionic liquid capable of being used in the present invention, and is not particularly limited, so long as it has lithium ionic conductivity and is thus capable of being used for the electrolyte for a lithium-air battery. For example, the ionic liquid may include one or more selected from the group consisting of 1-ethyl-3-methylimidazolium bis(trifluoromethylsulfonyl)imide (EMI-TFSI), diethylmethylammonium trifluoromethanesulfonate ([dema][TfO]), dimethylpropylammonium trifluoromethanesulfonate ([dmpa][TfO]), diethylmethylammonium trifluoromethanesulfonylimide ([dema][TFSI]), and methylpropylpiperidinium trifluoromethanesulfonylimide ([mpp][TFSI]), and is not limited to including specific components. Preferably useful is EMI-TFSI, having high ionic conductivity and high-potential stability.

Also, the electrolyte may further include an ionic conductive polymer. The ionic conductive polymer may be an ionic conductive polymer capable of being used in the present invention, and is not particularly limited, so long as it is able to form a good carbon-material/ionic-liquid complex even without the use of a dispersant through pi bonding of the surface of the carbon material and pi-cation bonding between ionic liquid cations. For example, the ionic conductive polymer may suitably include one or more selected from the group consisting of polyethylene oxide (PEO), polyvinyl alcohol (PVA), polyvinylpyrrolidone (PVP), and polysulfone, and is not limited to including specific components.

Upon the conventional preparation of a cathode slurry for manufacturing a cathode, a slurry form may be obtained only when the mass ratio of the carbon material and the electrolyte is greater than about 1:20, which is problematic in that the electrolyte is included in excess and thus the mass of the cathode becomes heavy. However, the present invention is advantageous in that a solvent component is further included in the cathode material and thus the amount of the electrolyte may be reduced, thereby reducing the mass of the cathode, ultimately increasing the energy density of a lithium-air battery including the cathode.

According to various exemplary embodiments, the cathode material may include the solvent component, and thus the mass ratio of the carbon material and the electrolyte may be about 1:2-20, or particularly about 1:2-10. When the mass ratio of the carbon material and the electrolyte is less than about 1:2, the ionic conductivity at the cathode may become insufficient due to the insufficient amount of the electrolyte. On the other hand, when the mass ratio thereof is greater than about 1:20, there is little effect of use of the solvent component.

(3) Solvent Component

The solvent component is not particularly limited, so long as it is included in the cathode material and thus the cathode slurry may be efficiently prepared even in the presence of a small amount of the electrolyte.

The solvent component is a typically known solvent component capable of being used in the present invention, and may be, for example, a solvent component that enables the carbon material to be uniformly dispersed in the electrolyte to thus efficiently form a path for the transport of lithium ions.

The solvent component may be a typically known solvent capable of being used in the present invention, and may suitably include one ore more selected from the group consisting of, for example, N-methyl-2-pyrrolidone (NMP), dimethylacetamide (DMAc), propanol, acetone, isopropanol (IPA), CAN (ceric ammonium nitrate), GBL (gamma butyrolactone), sulfolane, carbitol (diethylene glycol monoethyl ether), glycol, TEG (tetraethylene glycol), MPA (monoisopropanolamine), EDA (methyl beta-methoxypropionate), MEA (monoethanolamine), catechol, DETA (diethylenetriamine), DGME (diethylene glycol monoethyl ether), MMA (methyl methacrylate), DMF (dimethyl formamide), $CCl_4$, DCE (1,2-dichloromethane), DCB (1,2-dichlorobenzene), RMPA (hexamethylphosphoramide), DMEU (1,3-dimethyl-2-imidazolidinone), MC (dichloromethane), methanol, ethanol, butanol, dioxane, tetrahydrofuran (THF), acetone, acetonitrile, 1-propanol, ethylene glycol, pyridine, hydrazine, and nitromethane, and is not limited to including specific components. Preferably, the solvent component may be NMP, in which charge/discharge capacity increases in proportion to the amount of the electrolyte.

In the present invention, the amount of the solvent component may be 50 to 250 mL per g of the carbon material, e.g., for the coating process. When the amount thereof is less than the above lower limit, an appropriate slurry may not be formed, and thus it is difficult to perform the coating process. On the other hand, when the amount thereof exceeds the above upper limit, the slurry viscosity may be so low that it is difficult to ensure a desired coating thickness, and residual solvent may remain in the drying process.

The cathode material according to the present invention includes the solvent component and thus includes the electrolyte in less amount than the amount of electrolyte in a conventional cathode material. Thereby, the weight of a cathode manufactured using the above cathode material may be reduced, so the energy density of a lithium-air battery including the cathode may be increased.

(4) Binder

The binder is not particularly limited, so long as it is able to increase the amount of the cathode slurry that is loaded on a current collector in order to manufacture a cathode.

The binder may be a typically known binder capable of being used in the present invention, and may include one or more selected from the group consisting of, for example, poly(diallyldimethylammonium) bis(trifluoromethanesulfonyl)imide (PDDA-TFSI), polyethylene, polypropylene, polytetrafluoroethylene (PTFE), polyvinylidene fluoride (PVdF), styrene-butadiene rubber, tetrafluoroethylene-perfluoroalkyl vinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethylvinyl ether-tetrafluoroethylene copolymer, and ethylene-acrylic acid copolymer, and is not limited to including specific components. For example, PVdF may cause side reactions upon reaction of the lithium-air battery, and PTFE may not sufficiently perform the function of the binder between the carbon material and the electrolyte. Preferably, the binder may suitably include PDDA-TFSI, which may sufficiently perform the function of the binder between the carbon material and the electrolyte and increase the lifetime of a battery by suppressing an increase in overvoltage by maintaining abundant ionic conductivity.

The amount of the binder may be about 15 to 25 parts by weight based on 100 parts by weight of the carbon material.

The cathode material may suitably include a PDDA-TFSI binder in a specific amount, thereby increasing the amount of the cathode slurry layer that is loaded on the current collector during manufacture of the cathode, thereby increasing the charge/discharge capacity of a lithium-air battery including the cathode.

Method of Manufacturing Cathode and Cathode

FIG. 1 is a flowchart showing an exemplary process of manufacturing an exemplary cathode according to an exemplary embodiment of the present invention. For example, the method may include preparing a cathode slurry including a cathode material (S10), forming a cathode slurry layer by applying the cathode slurry on a current collector (S20), and heat-treating the cathode slurry layer (S30).

In the preparation of the cathode slurry (S10), a cathode material may be prepared and mixed to afford a cathode slurry.

The cathode material may include a carbon material, an electrolyte, a solvent component, and a binder, and the carbon material, electrolyte, solvent, and binder used therein are as described in the cathode material above.

In the formation of the cathode slurry layer (S20), the cathode slurry thus prepared may be applied on a current collector, thus forming a cathode slurry layer.

The current collector is a typically known current collector capable of being used in the present invention, for example, a carbon substrate having a porous structure such as a network or mesh structure, in order to rapidly diffuse oxygen, stainless steel, nickel, aluminum, etc., but is not necessarily limited thereto. Preferably useful is a carbon substrate having a structure able to ensure electrical conductivity and air permeability and capable of realizing a desired energy density due to the light weight thereof. Moreover, the current collector may be coated with an oxidation-resistant metal or alloy film in order to prevent oxidation.

The cathode slurry may optionally include a conventional oxygen oxidation/reduction catalyst and a conductive material. Also, the cathode slurry may optionally include lithium oxide. The conductive material may be used without limitation, so long as it has porosity and conductivity, for example, a carbon-based material having porosity. Examples of the carbon-based material may include carbon black, graphite, graphene, activated carbon, carbon fiber, etc. Also, a metallic conductive material such as metal fiber, metal mesh, etc. may be used. Also, a metallic powder such as copper, silver, nickel, aluminum, etc. may be included. An organic conductive material, such as a polyphenylene derivative, etc., may be used. These conductive materials may be used alone or in combination.

The process of applying the cathode slurry on the current collector is a typical coating process capable of being used in the present invention; for example, as a slurry-casting process, any one selected from the group consisting of a doctor blade process, a dip-coating process, a spray-coating process and a roll-coating process may be performed, but without limitation to a specific process. Preferably, the cathode slurry may be applied on the current collector using a doctor blade process capable of realizing a large area and a cathode in which the cathode slurry is loaded in a large amount.

The cathode slurry layer applied on the current collector may have a thickness of about 100 to 1000 μm, or particularly of about 700 to 1000 μm. When the thickness thereof is less than about 700 μm, the reaction area may decrease, and consequently the energy density may be reduced. On the other hand, when the thickness thereof is greater than about 1000 μm, poor processability may result, and air permeability may be impaired.

The cathode slurry may include the PDDA-TFSI binder in a specific amount, and thus the loading of the cathode slurry layer may be greatly increased compared to conventional techniques, thereby increasing the charge/discharge capacity of the lithium-air battery including the cathode.

In the heat treatment of the cathode slurry layer (S30), the cathode slurry layer may be heat-treated, thus selectively evaporating the electrolyte, that is, the solvent component.

The heat treatment may be carried out at a temperature ranging from room temperature to about 110° C., or particularly at room temperature, for about 24 to 48 hr.

When the heat treatment time is less than about 24 hr, residual solvent may remain. On the other hand, when the heat treatment time is greater than about 48 hr, the processing time is excessive. Also, when the heat treatment temperature is less than room temperature, drying may be insufficient, whereas when the heat treatment temperature is greater than about 110° C., the cathode may be thermally damaged.

A cathode manufactured through the method of manufacturing the cathode may include the electrolyte in a small amount, and thus the weight thereof may be reduced, thereby increasing the energy density of a lithium-air battery including the cathode. Moreover, it may include the PDDA binder in a specific amount, whereby the amount of the cathode slurry layer that is loaded may be greatly increased to about 3.00 to 3.50 mg/cm$^2$, surpassing conventional techniques, and may be further increased to about 6.00 mg/cm$^2$ due to the use of the solvent component and the binder. Therefore, the charge/discharge capacity of the lithium-air battery including such a cathode may be increased.

Lithium-Air Battery

A lithium-air battery may include the cathode as described herein, an anode, and a polymer electrolyte interposed between the cathode and the anode.

The anode is not particularly limited, so long as it enables deposition/dissolution of lithium. Specifically, it may include Li metal, a Li-metal-based alloy, or a material capable of depositing and dissociating Li, but is not necessarily limited thereto, and any material capable of being used for the anode in the art may be used, so long as it includes lithium or enables deposition/dissolution of lithium. Since the anode determines the capacity of the lithium-air battery, the anode may be, for example, lithium metal. The lithium-metal-based alloy may be an alloy of lithium with, for example, aluminum, tin, magnesium, indium, calcium, titanium, vanadium, or the like.

Also, a lithium-ionic conductive polymer electrolyte may be additionally positioned between the cathode and the anode. Examples of the lithium-ionic conductive polymer electrolyte include inorganic materials, including lithium-ionic conductive glass, lithium-ionic conductive crystals (ceramic or glass-ceramic), or mixtures thereof, but are not necessarily limited thereto. Any polymer electrolyte may be used, so long as it is capable of being used in the art as a polymer electrolyte having lithium ionic conductivity and protecting the cathode or the anode. For example, for chemical stability, the lithium-ionic conductive polymer electrolyte may be in a form of an oxide.

When charging and discharging the lithium-air battery including the above configuration and the cathode, the charge/discharge voltage thereof may be about 2 to 4.7 V, and the charge/discharge capacity thereof may be about 12 to 25 mAh/cm$^2$.

Therefore, the cathode manufactured through the method of manufacturing the cathode as described herein includes the electrolyte in the reduced amount, and thus the weight thereof can be reduced, thereby increasing the energy density of the lithium-air battery including the cathode. The PDDA-TFSI binder may be included in a specific amount, whereby the amount of the cathode slurry layer that is loaded may be greatly increased to about 3.00 to 6.00 mg/cm$^2$. Accordingly, the charge/discharge capacity of the lithium-air battery including the cathode may be increased to about 12 to 25 mAh/cm$^2$.

EXAMPLE

A better understanding of the present invention will be given through the following examples. However, these examples are merely set forth to illustrate the present invention, and are not to be construed as limiting the scope of the present invention.

Example 1-1

Manufacture of Cathode Including Cathode Material

In a step of S10, a cathode material was prepared by mixing 0.024 g of porous carbon nanotubes (CNTs) as a carbon material, an electrolyte composed of 0.2272 g (or mL) of 1-ethyl-3-methylimidazolium bis(trifluoromethylsulfonyl)imide (EMI-TFSI) as an ionic liquid and 0.0128 g of LiTFSI as a lithium salt, 3.4 mL of N-methyl-2-pyrrolidone (NMP) as a solvent component, and 0.006 g of poly(diallyldimethylammonium) bis(trifluoromethanesulfonyl)imide (PDDA-TFSI) as a binder. Here, the mass ratio of CNTs and EMI-TFSI was 1:10. The cathode material thus prepared was mixed, thus preparing a cathode slurry.

In step of S20 and S30, the cathode slurry thus prepared was applied to a thickness of 850 μm on a carbon substrate as a current collector. Next, heat treatment in a vacuum at room temperature for 24 hr and drying were performed, thereby manufacturing a cathode.

Example 1-2

Manufacture of Cathode Including Cathode Material

A cathode was manufactured in the same manner as in Example 1-1, with the exception that the cathode slurry was applied to a thickness of 1000 μm on a carbon substrate.

Example 1-3 to Example 1-7

Manufacture of Cathode Including Cathode Material

Respective cathodes were manufactured in the same manner as in Example 1-1, with the exception that a cathode slurry in which the binder was not included in the cathode material was applied on a carbon substrate to a thickness of 370 μm (Example 1-3), 410 μm (Example 1-4), 510 μm (Example 1-5), 580 μm (Example 1-6), and 710 μm (Example 1-7).

Example 2-1 to Example 2-7

Manufacture of Lithium-Air Battery Including Cathode

Lithium-air batteries (Example 2-1 to Example 2-7) corresponding to the cathodes (Example 1-1 to Example 1-7) were manufactured using the cathode of each of Example 1-1 to Example 1-7, a lithium metal anode, and a polymer electrolyte.

Example 3-1 to Example 3-3

Manufacture of Lithium-Air Battery Including Solvent Component NMP and Using Conductive Material and Electrolyte at Different Mass Ratios Lithium-air batteries were manufactured in the same manner as in Example 2-1, with the exception that the mass ratio of CNTs and EMI-TFSI was adjusted to 1:2 (Example 3-1), 1:3 (Example 3-2), and 1:5 (Example 3-3).

Example 4-1 to Example 4-3

Manufacture of Lithium-Air Battery Including Solvent Component DMAc and Using Conductive Material and Electrolyte at Different Mass Ratios Lithium-air batteries were manufactured in the same manner as in Example 3-1 to Example 3-3, with the exception that a cathode material including dimethylacetamide (DMAc) as the solvent component was prepared.

Comparative Example 1 to Comparative Example 6

Manufacture of Cathode Slurry

A cathode material was prepared by mixing porous carbon nanotubes (CNTs) as a carbon material and an electrolyte composed of 1-ethyl-3-methylimidazolium bis(trifluoromethylsulfonyl)imide (EMI-TFSI) as an ionic liquid. The mass ratio of CNTs and EMI-TFSI was set to 1:2 (Comparative Example 1), 1:3 (Comparative Example 2), 1:5 (Comparative Example 3), 1:10 (Comparative Example 4), 1:20 (Comparative Example 5), and 1:30 (Comparative Example 6).

Test Example 1

Figure 2:
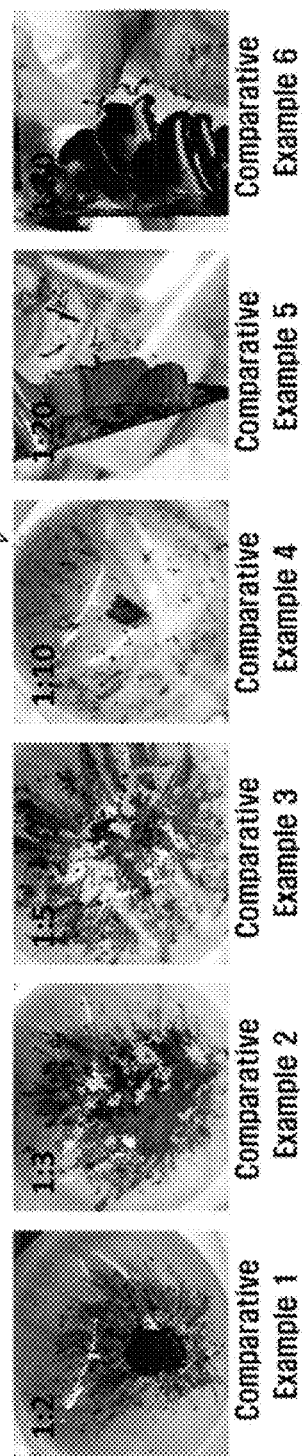
FIG. 2 shows results of use of the cathode materials of Comparative Example 1 to Comparative Example 6 in order to evaluate whether or not a cathode slurry is prepared.
Figure 3:
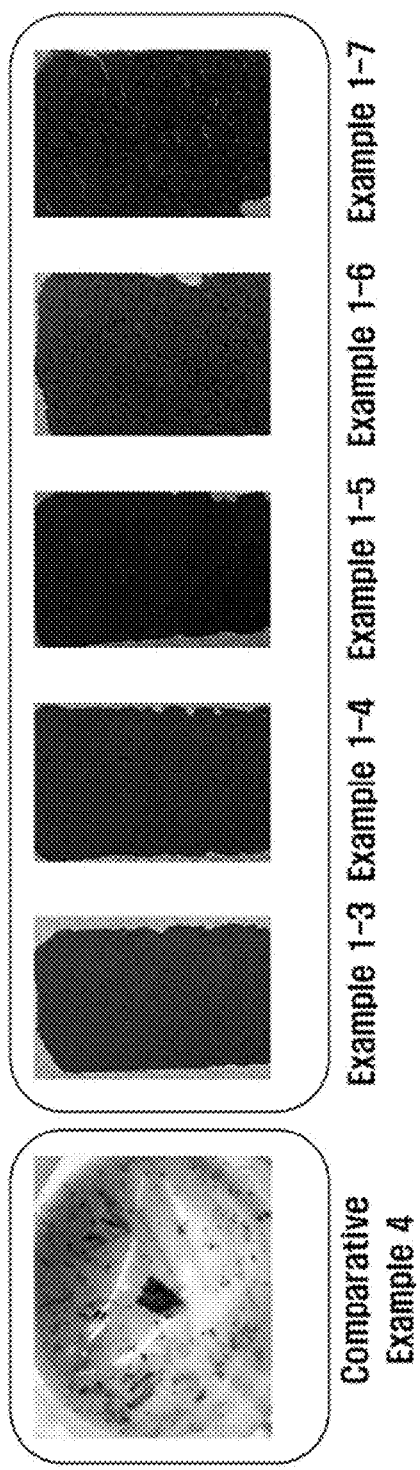
FIG. 3 shows forms of the cathodes of Example 1-3 to Example 1-7 according to exemplary embodiments of the present invention.

Manufacture of Cathode Slurry and Cathode Depending on Presence or Absence of Solvent Component The cathode slurry of Example 1-3 to Example 1-7 was compared with the cathode slurry of Comparative Example 1 to Comparative Example 6 as shown in FIGS. 2 and 3, and cathodes were manufactured using the same.

As shown in FIG. 2, when the cathode was manufactured using the cathode material of Comparative Example 1 and Comparative Example 2, a powdery form was obtained, rather than a cathode slurry form, indicating that it was difficult to form a cathode slurry. Also, when the cathode was manufactured using the cathode material of Comparative Example 3 to Comparative Example 5, a gel-like gum complex was obtained, rather than a slurry form, indicating that it was difficult to form a cathode slurry. Consequently, the slurry form was obtained at a ratio of the carbon nanotubes to the ionic liquid of 1:20 or more, as in Comparative Example 6, and when the ratio thereof reached 1:30, slurry viscosity sufficiently high to be spreadable using a doctor blade was obtained. Specifically, a slurry form could be obtained only when using the cathode material at the ratio of the carbon nanotubes to the ionic liquid of 1:20 or more, making it possible to manufacture a cathode therefrom.

As shown in FIG. 3, in the manufacture of the cathode using the cathode material including the solvent component, as in Example 1-3 to Example 1-7, even when the ratio of the carbon nanotubes and the ionic liquid in the cathode material was only about 1:10, a cathode slurry could be obtained, indicating that cathodes having various thicknesses could be manufactured.

Therefore, the cathode material according to various exemplary embodiments of the present invention includes the solvent component and thus includes the electrolyte in less amount that the amount of the electrolyte in the conventional cathode materials, such that the weight of the cathode manufactured using the cathode material can be reduced, ultimately increasing the energy density of the lithium-air battery including the cathode of the present invention.

Test Example 2

Evaluation of Charge/Discharge Capacity of Lithium-Air Battery Depending on Type of Solvent Component In order to select a solvent component that does not interfere with the ionic liquid as the electrolyte, the results of evaluation of charge/discharge capacity of the lithium-air batteries of Example 3-1 to Example 3-3 and Example 4-1 to Example 4-3 were compared.

Figure 4:
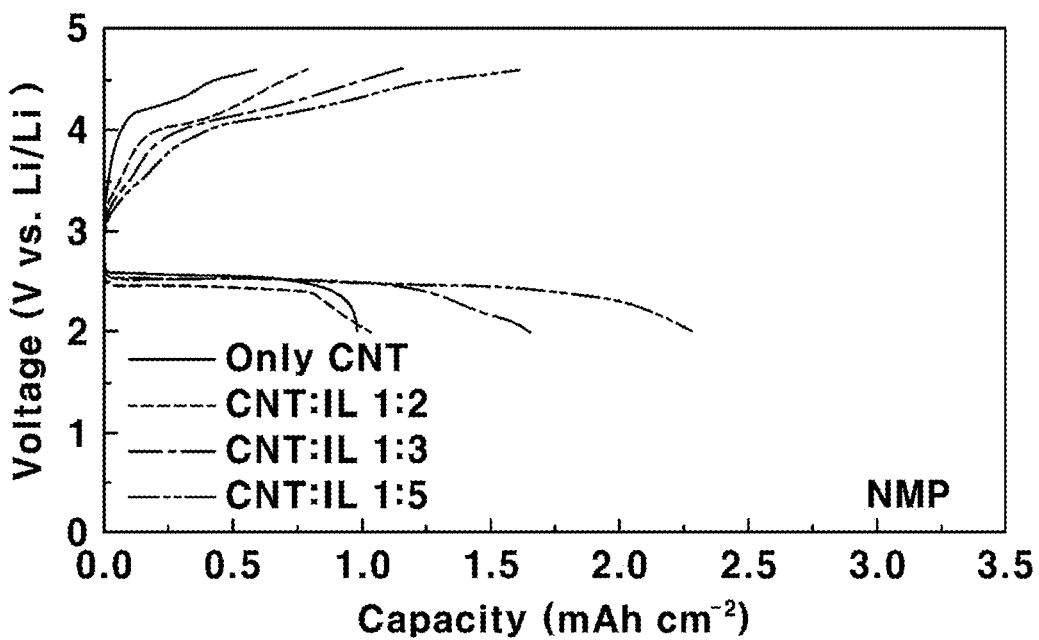
FIG. 4 shows the charge/discharge capacity of the lithium-air batteries manufactured in Example 3-1 to Example 3-3 according to exemplary embodiments of the present invention.
Figure 5:
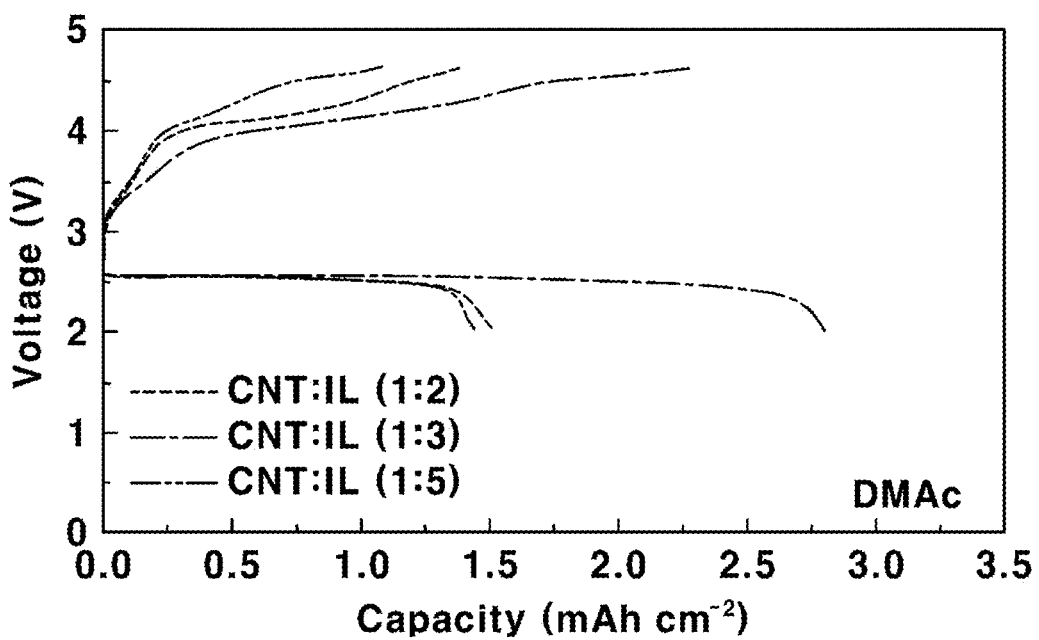
FIG. 5 shows the charge/discharge capacity of the lithium-air batteries manufactured in Example 4-1 to Example 4-3 according to exemplary embodiments of the present invention.

As shown in FIGS. 4 and 5, when using the solvent component, the cathode could be manufactured from the cathode material including the carbon nanotubes and the ionic liquid at a mass ratio of 1:2, and thus a lithium-air battery could be manufactured therefrom. In particular, as shown in FIG. 4, in the lithium-air battery manufactured using N-methyl-2-pyrrolidone (NMP) as the solvent component (Example 3-1 to Example 3-3), the charge/discharge capacity thereof was increased in proportion to the amount of the ionic liquid. In contrast, as shown in FIG. 5, in the lithium-air battery manufactured using dimethylacetamide (DMAc) as the solvent component (Example 4-1 to Example 4-3), the charge/discharge capacity thereof was not increased in proportion to the amount of the ionic liquid, based on which NMP was determined to be suitable for use as the solvent component according to the present invention.

Test Example 3

Evaluation of Loading of Conductive Material Depending on Thickness of Cathode Slurry Layer and Discharge Capacity of Lithium-Air Battery The loading of the conductive material included in the cathode depending on the thickness of the cathode slurry layer in Example 1-3 to Example 1-7 was measured, and the discharge capacity of the lithium-air battery including the cathode in Example 2-3 to Example 2-7 was measured.

Figure 6:
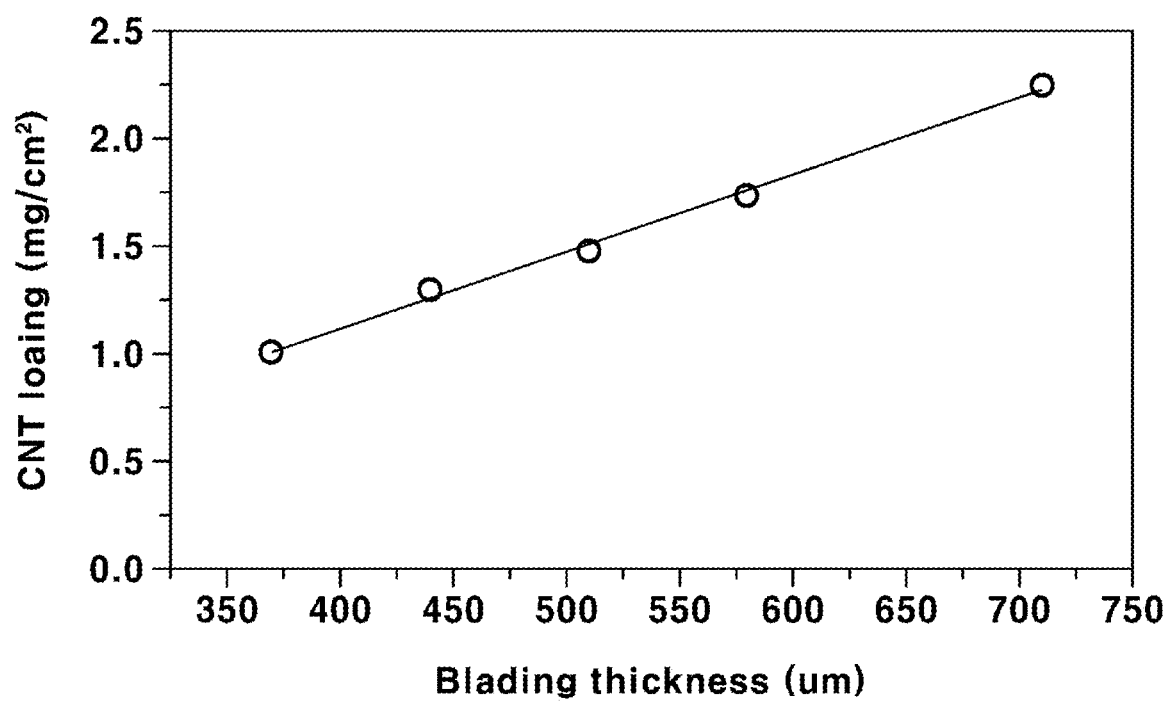
FIG. 6 shows a graph of the loaded carbon nanotubes depending on the thickness of the cathode in Example 1-3 to Example 1-7 according to exemplary embodiments of the present invention.
Figure 7:
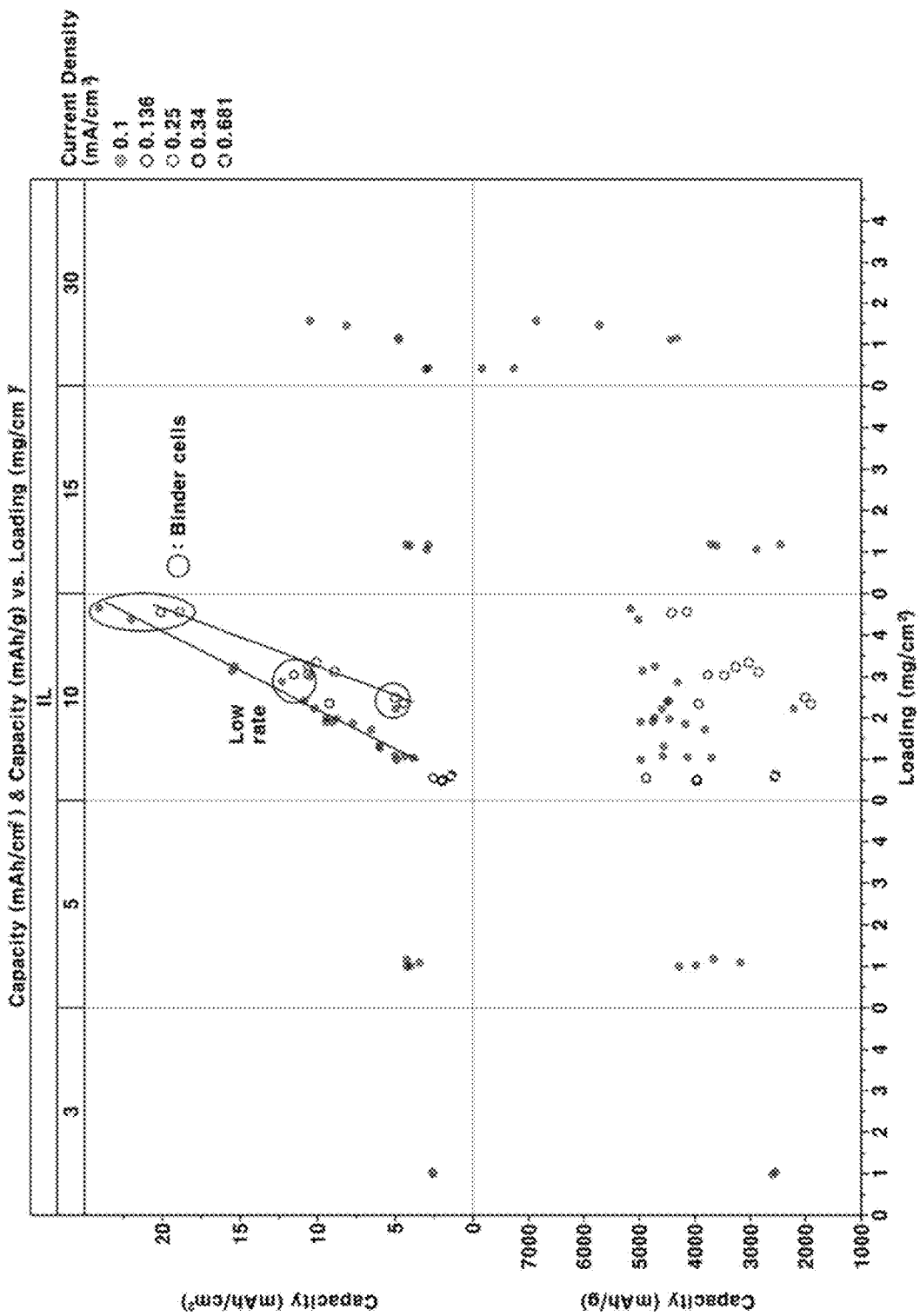
FIG. 7 shows a graph of the charge/discharge capacity of the lithium-air batteries of Example 2-3 to Example 2-7 according to exemplary embodiments of the present invention.

As results thereof, as shown in FIG. 6, the loading of the carbon nanotubes as the conductive material was increased in proportion to the increase in the coating thickness of the cathode slurry. Moreover, as shown in FIG. 7, the charge/discharge capacity was increased in proportion to an increase in the amount of the carbon nanotubes that were loaded.

Figure 8:
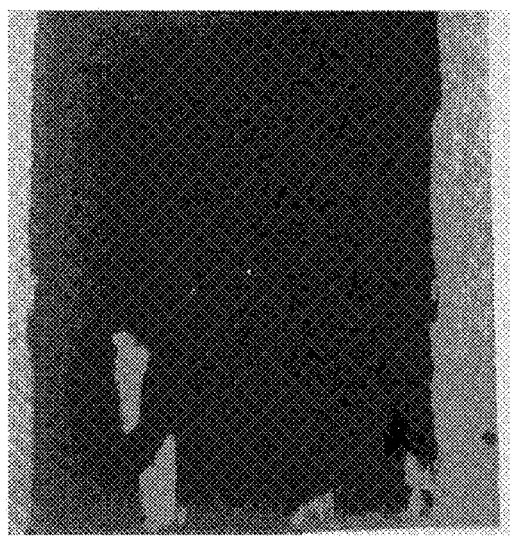
FIG. 8 shows the forms of the cathodes of Example 1-1 and Example 1-2 according to exemplary embodiments of the present invention.
Figure 8:
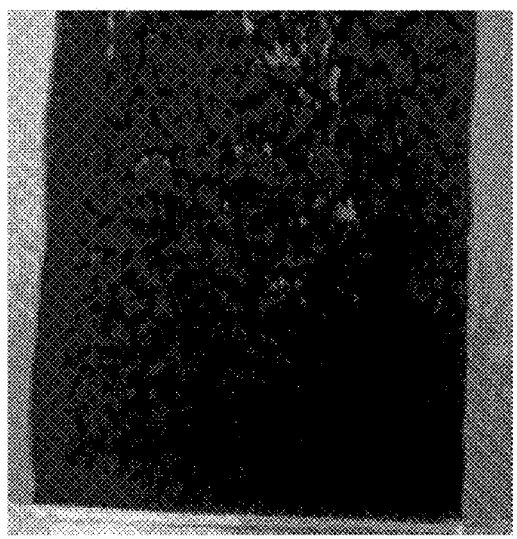

Based on the above results, a lithium-air battery having increased charge/discharge capacity can be manufactured by increasing the coating thickness, and thus, in order to further increase the coating thickness, the binder was further added. As shown in FIG. 8, it was confirmed that the coating did not crack and was maintained well even when using the cathodes having a thickness of 710 μm to 1000 μm in Example 1-1 and Example 1-2.

Figure 9:
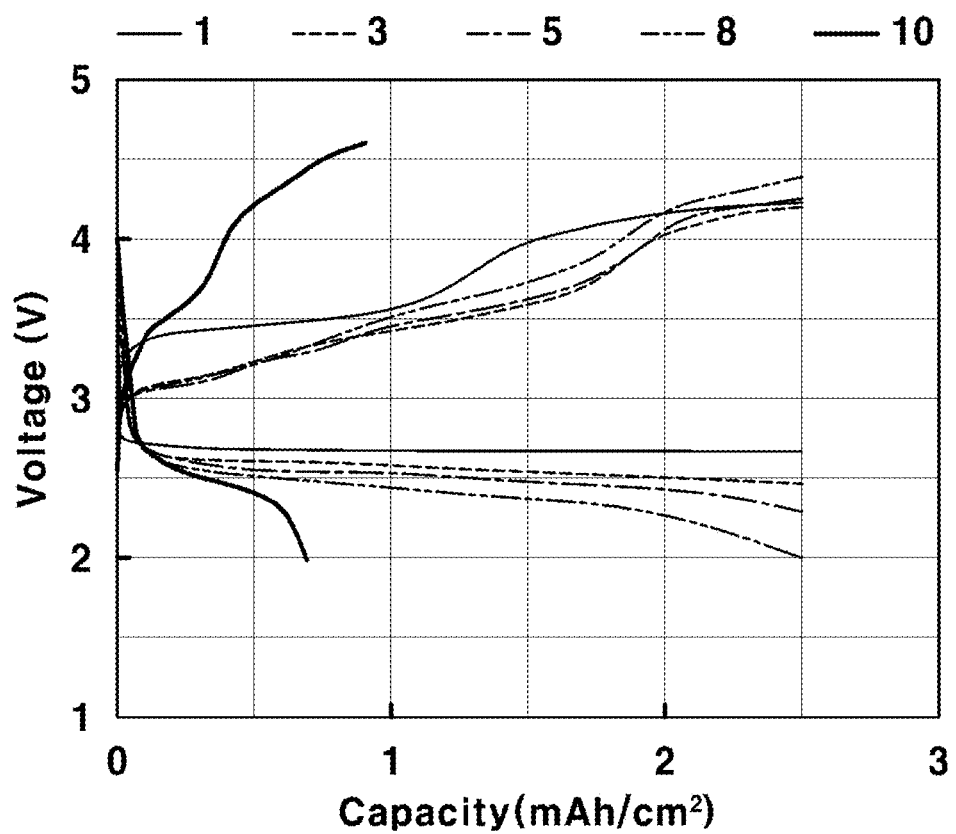
FIG. 9 shows a graph of the charge/discharge capacity of the lithium-air battery of Example 1-2 according to an exemplary embodiment of the present invention.

The charge/discharge capacity of the lithium-air battery including the cathode of Example 1-1 and Example 1-2 (Example 2-1 and Example 2-2) was measured at a current rate of 0.25 mA/cm$^2$ and at a capacity of 2.5 mAh/cm$^2$ in a chamber at a temperature of 60° C. As results thereof, as shown in FIG. 9, the charge/discharge voltage thereof was 2 to 4.7 V, and the charge/discharge capacity thereof was 12 to 25 mAh/cm$^2$.

Therefore, the cathode manufactured through the method of manufacturing the cathode according to various exemplary embodiments of the present invention includes the electrolyte in the reduced amount, thus reducing the weight thereof. As such, the energy density of the lithium-air battery including the cathode can be increased. Further, as the PDDA binder is included in a specific amount, the amount of the cathode slurry layer that is loaded can be greatly increased to about 3.00 to 6.00 mg/cm$^2$, so the charge/discharge capacity of the lithium-air battery including the cathode can be increased to about 12 to 25 mAh/cm$^2$.

What is claimed is:

1. A cathode, comprising:
   a current collector; and
   a cathode slurry layer formed on the current collector and comprising a cathode material,
   wherein the cathode material comprises a carbon material, an electrolyte, a solvent component and a binder,
   wherein the electrolyte comprises a lithium salt and an ionic liquid,
   a mass ratio of the carbon material and the electrolyte is 1:2-20,
   an amount of the solvent component is 50 to 250 mL per g of the carbon material, and
   wherein the cathode slurry layer has a thickness of 700 to 1000 μm.

2. The cathode of claim 1, wherein the carbon material comprises one or more selected from the group consisting of carbon nanotubes (CNTs), carbon nanofibers, carbon nanobelts and mixtures thereof.

3. The cathode of claim 1, wherein the ionic liquid comprises one or more selected from the group consisting of 1-ethyl-3-methylimidazolium bis(trifluoromethylsulfonyl)imide (EMI-TFSI), diethylmethylammonium trifluoromethanesulfonate ([dema][TfO]), dimethylpropylammonium trifluoromethanesulfonate ([dmpa][TfO]), diethylmethylammonium trifluoromethanesulfonylimide ([dema][TFSI]), methylpropylpiperidinium trifluoromethanesulfonylimide ([mpp][TFSI]) and mixtures thereof.

4. The cathode of claim 1, wherein the solvent component comprises N-methyl-2-pyrrolidone (NMP).

5. The cathode of claim 1, wherein the binder comprises poly(diallyldimethylammonium) bis (trifluoromethanesulfonyl)imide (PDDA-TFSI).

6. The cathode of claim 1, wherein an amount of the binder is 15 to 25 parts by weight based on 100 parts by weight of the carbon material.

7. A method of manufacturing a cathode, comprising:
   preparing a cathode slurry comprising a cathode;
   forming a cathode slurry layer by applying the cathode slurry on a current collector; and
   heat-treating the cathode slurry layer,
   wherein the cathode comprises a carbon material, an electrolyte, a solvent component and a binder,
   wherein the electrolyte comprises a lithium salt and an ionic liquid, and
   a mass ratio of the carbon material and the electrolyte is 1:2-20,
   wherein an amount of the solvent component is 50 to 250 mL per g of the carbon material, and
   wherein the cathode slurry layer has a thickness of 700 to 1000 μm.

8. The method of claim 7, wherein the heat-treating is performed in a vacuum at room temperature for 22 to 48 hr.

9. A lithium-air battery, comprising:
   the cathode of claim 1;
   an anode enabling deposition and dissociation of lithium; and
   a polymer electrolyte interposed between the cathode and the anode,
   wherein the lithium-air battery has a charge/discharge voltage of 2 to 4.7 V and a charge/discharge capacity of 12 to 25 mAh/cm$^2$.

10. The cathode of claim 1, wherein the cathode comprises a carbon material loaded in an amount of 3.00 to 6.00 mg/cm$^2$.

* * * * *